United States Patent [19]

Tahara et al.

[11] Patent Number: 4,575,862

[45] Date of Patent: Mar. 11, 1986

[54] CROSS-POLARIZATION DISTORTION CANCELLER FOR USE IN DIGITAL RADIO COMMUNICATION RECEIVER

[75] Inventors: Masato Tahara; Toshihiko Ryu, both of Tokyo, Japan

[73] Assignee: NEC Corporation, Tokyo, Japan

[21] Appl. No.: 563,364

[22] Filed: Dec. 20, 1983

[30] Foreign Application Priority Data

Dec. 20, 1982 [JP] Japan ................................ 57-223466
Jan. 29, 1983 [JP] Japan ................................ 58-13141
Jul. 22, 1983 [JP] Japan ................................ 58-134121
Oct. 14, 1983 [JP] Japan ................................ 58-191869

[51] Int. Cl.⁴ .............................................. H04B 1/10
[52] U.S. Cl. ...................................... 375/102; 375/11; 455/296
[58] Field of Search ................... 375/11, 99, 100, 101, 375/102, 103; 328/165; 455/295, 296; 343/361

[56] References Cited

U.S. PATENT DOCUMENTS

| | | | |
|---|---|---|---|
| 4,112,370 | 9/1978 | Monsen | 375/100 |
| 4,321,705 | 3/1982 | Namiki | 375/99 |
| 4,328,585 | 5/1982 | Monsen | 375/100 |
| 4,367,555 | 1/1983 | Namiki et al. | 375/11 |

Primary Examiner—Robert L. Griffin
Assistant Examiner—Stephen Chin
Attorney, Agent, or Firm—Laff, Whitesel, Conte & Saret

[57] ABSTRACT

The present invention features a cross-polarization distortion canceller for use in a digital radio communication receiver, wherein error signal compensation is achieved by providing the baseband signals and the error signals using the same recovered signal or by using an error signal compensating circuit wherein carrier signals are compared in phase for generating adjusted error signals.

15 Claims, 12 Drawing Figures

| ERROR SIGNAL / LOCK PHASE | (1) | (2) | (3) | (4) |
|---|---|---|---|---|
| Ep(H) | Ep(H) | Eq(H) | −Ep(H) | −Eq(H) |
| Eq(H) | Eq(H) | −Ep(H) | −Eq(H) | Ep(H) |

FIG. 5
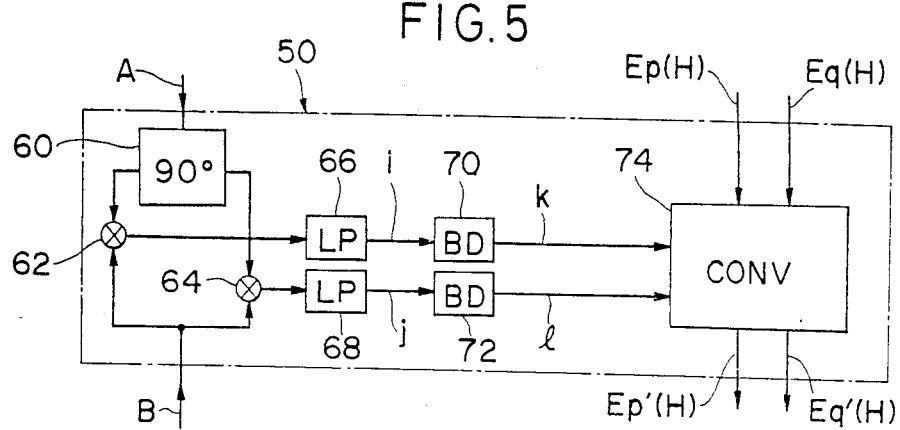
FIG. 6
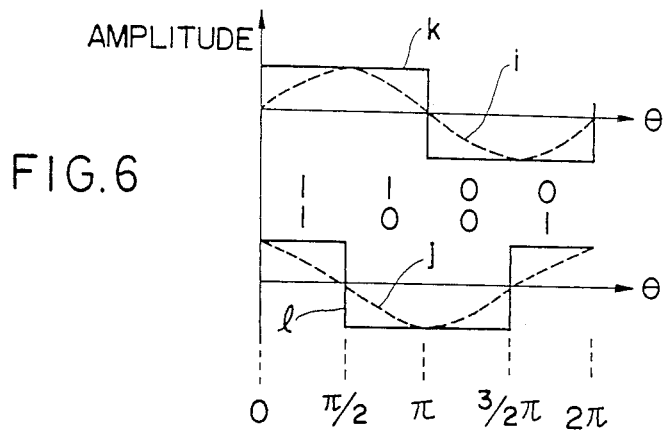
FIG. 7
| k | 1 | 1 | 0 | 0 |
|---|---|---|---|---|
| $\ell$ | 1 | 0 | 0 | 1 |
| OUT \ θ | $0 \sim \pi/2$ | $\pi/2 \sim \pi$ | $\pi \sim 3/2\pi$ | $3/2\pi \sim 2\pi$ |
| Ep'(H) | Ep(H) | -Eq(H) | -Ep(H) | Eq(H) |
| Eq'(H) | Eq(H) | Ep(H) | -Eq(H) | -Ep(H) |

CROSS-POLARIZATION DISTORTION CANCELLER FOR USE IN DIGITAL RADIO COMMUNICATION RECEIVER

BACKGROUND OF THE INVENTION

1. Field of the invention

This invention relates generally to a cross-polarization distortion canceller for use in a digital radio communication receiver, and more specifically to such a canceller provided in an intermediate frequency (IF) section of a digital radio communication receiver for re-establishing orthogonality of two orthogonally polarized transmitted signals.

2. Description of the Prior Art

The crowding of the frequency spectrum in a radio communication system has led to an extremely limited availability of transmission channels. A known approach to solving this problem is the use of the two orthogonally polarized waves for doubling the capacity of the radio communication system.

Under normal circumstances cross-polarization distortions, i.e. the effects of interference between such orthogonally polarized signals, are sufficiently low to result in overall good performance. However, when poor propagation conditions exist, such as during heavy rain, or air turbulence is present, or when the signals travel through a multipath communication medium, the cross-polarization distortions tend to increase and the two signals are not easily isolated merely on the basis of polarization.

In order to re-establish the orthogonality (i.e., to reduce or cancel the cross-polarization distortion), it has been proposed to provide an equalizer or compensating means in a digital radio communication receiver. A prior art equalizer or control means, however, has been installed in the baseband stage and hence requires a considerable number of transversal filters, resulting in a complex circuit configuration.

SUMMARY OF THE INVENTION

The object of the present invention is therefore to provide, in an IF stage, a cross-polarization distortion canceller or a control system for re-establishing orthogonality of two orthogonally polarized transmitted signals.

Another object of the present invention is to provide a cross-polarization distortion canceller having therein an error signal compensator for adaptively changing the values and polarities of incoming error signals in response to phase differences of two recovered carriers.

Still another object of this invention is to provide a cross-polarization distortion canceller suited for a receiver in which two receiving channels are separated and/or remotely arranged.

Still another object of this invention is to provide a cross-polarization distortion canceller provided with an improved transversal filter.

Still another object of this invention is to provide a cross-polarization distortion canceller wherein a phase-compensator is provided for maintaining the algorithms of a transversal filter forming part of the canceller.

In general terms the present invention features a cross-polarization distortion canceller for use in a digital radio communication receiver, wherein error signal compensation is achieved by providing the baseband signals and the error signals using the same recovered signal or by using an error signal compensating circuit wherein carrier signals are compared in phase for generating adjusted error signals.

More specifically, the present invention takes the form of a cross-polarization distortion canceller for use in a digital radio communication receiver, comprising: a first variable coupler being adapted to receive a first IF signal of incoming two orthogonally polarized modulated IF signals; a second variable coupler being adapted to receive a second IF signal of the incoming two orthogonally polarized modulated IF signals; a first demodulator for receiving the first IF signal via the first variable coupler and demodulating the first IF signal, the first demodulator producing first baseband signals as well as first error signals according to the first IF signal, and outputting a first recovered carrier; a second demodulator for receiving the second IF signal via the second variable coupler and demodulating the second IF signal, the second demodulator producing second baseband signals as well as second error signals according to the second IF signal, and outputting a second recovered carrier; a first error signal compensator for receiving the first error signals and the first and second recovered carriers, the first error signal compensator outputting third error signals according to the phase differences between the first and second recovered carriers; a second error signal compensator for receiving the second error signals and the first and second recovered carriers, the second error signal compensator outputting fourth error signals according to the phase differences between the first and second recovered carriers; a first control signal generator for receiving the third error signals and the second baseband signals, the first control signal generator applying first control signals to the first variable coupler; and a second control signal generator for receiving the fourth error signals and the first baseband signals, the second control signal generator applying second control signals to the second variable coupler; wherein the first variable coupler substantially cancels the portion of the second IF signal accompanying the first IF signal, and wherein the second variable coupler substantially cancels the portion of the first IF signal accompanying the second IF signal.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which:

FIG. 5 is a block diagram showing in detail one of the circuit blocks forming part of the FIG. 4 arrangement;

FIG. 6 shows in chart form waveforms of signals appearing in the FIG. 5 arrangement;

FIG. 7 is a table showing variations of error signals according to the variations of phase differences between two recovered carriers;

DETAILED DESCRIPTION OF THE PREFERRED EMBODIMENTS

Figure 1:
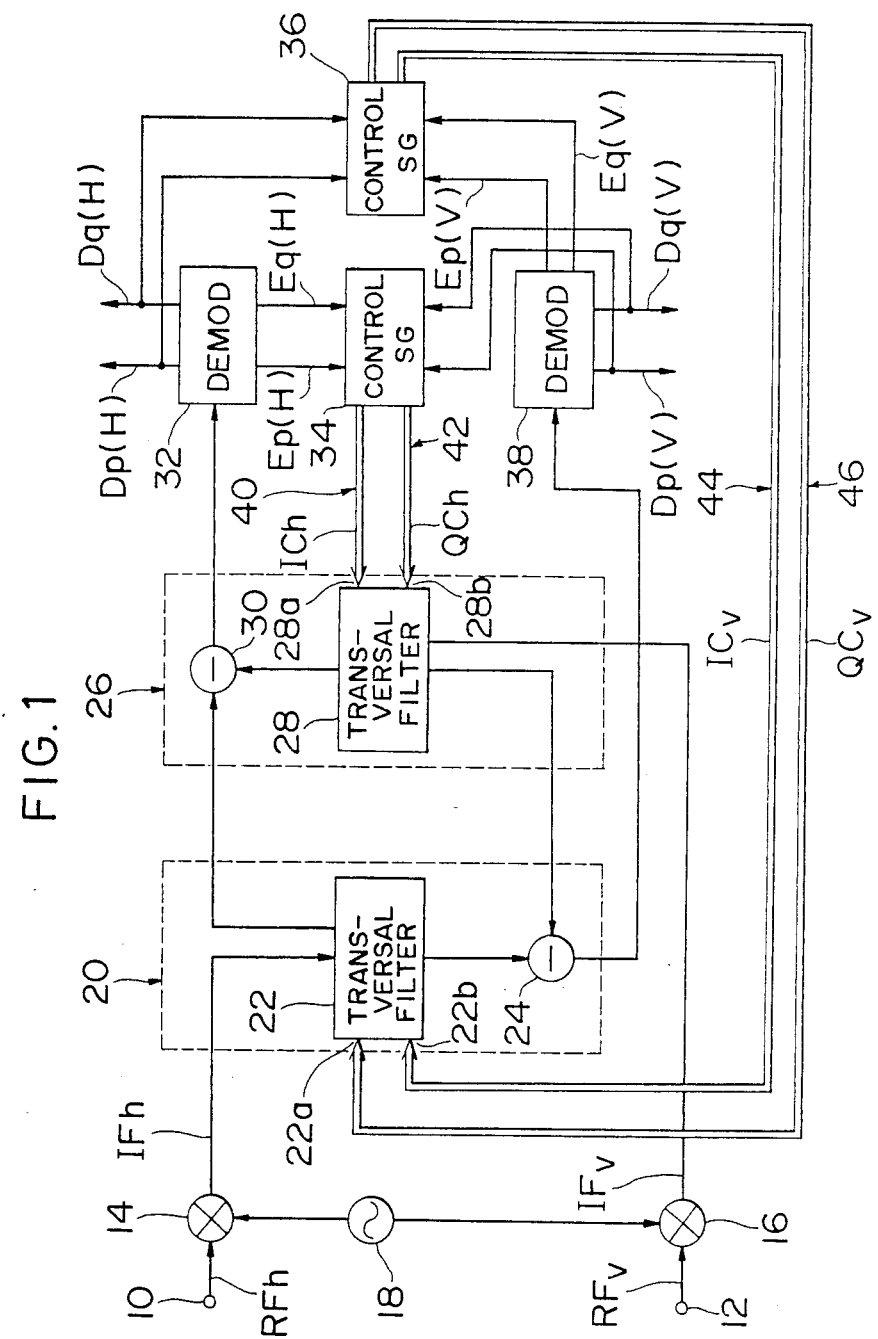
FIG. 1 is a block diagram showing a cross-polarization distortion canceller circuit which forms the basis of the various embodiments of the present invention.
Figures 2, 3:
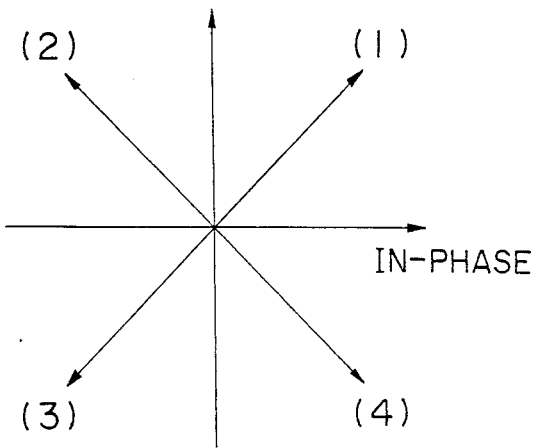
FIG. 2 is a complex coordinate for showing four lock phases of recovering a carrier wave.
FIG. 3 is a table showing variations of error signals with the changes of the lock phase.

Prior to the description of the preferred embodiments of this invention, reference is made to FIGS. 1 through 3 for highlighting the problems encountered where a canceller for cross-polarization distortion is provided in an IF stage of a digital radio communication receiver.

FIG. 1 is a block diagram showing a canceller provided in the IF stage, together with associated circuitry. The FIG. 1 block diagram generally comprises input terminals 10 and 12 for respectively receiving two orthogonally polarized RF (Radio Frequency) signals, mixers 14 and 16, a local oscillator 18, vertical and horizontal equalizers or variable coupler 20 and 26, horizontal and vertical demodulators 32 and 38, horizontal and vertical control signal generators 34 and 36, all of which are connected as shown. The equalizer 20 includes a transversal (tapped delay line) filter 22 and a subtracter 24, while the other equalizer 26 similarly includes a transversal filter 28 and a subtracter 30.

Incoming horizontally and vertically polarized RF signals RFh and RFv are applied to the mixers 14 and 16 via the input terminals 10 and 12, respectively. The mixers 14 and 16 convert the signals RFh and RFv into IF signals IFh and IFv respectively, with the help of the local oscillator 18 which is used in common. The output of the mixer 14 is fed to the transversal filter 22, while the output of the mixer 16 is applied to the transversal filter 28.

The transversal filter 22 applies the received IF signal IFh, via its main tap (not shown), to the subtracter 30. The filter 22 also receives in-phase and quadrature vertical control signals (tap weight control signals) ICv and QCv, at its input terminals 22a and 22b, from the control signal generator 36 over lines 44 and 46, respectively. Similarly, the transversal filter 28 applies the received IF signal IFv, via its main tap (not shown), to the substracter 24. The filter 28 also receives in-phase and quadrature horizontal control signals (tap weight control signals) ICh and QCh, at its input terminals 28a and 28b, from the control signal generator 34 over lines 40 and 42, as shown.

The subtracter 30 subtracts the output of the transversal filter 28 from the signal IFh (which is applied from the main tap of the filter 22) and hence cancels or reduces the cross-polarization distortion due to the vertically polarized wave. In a similar manner, the subtracter 24 subtracts the output of the transversal filter 22 from the signal IFv (which is applied from the main tap of the filter 28) and hence cancels or reduces the cross-polarization distortion due to the horizontally polarized wave.

The demodulator 32 receives the distortion free signal IFh from the subtracter 30, and generates a baseband or data signal Dh ($=Dp(H)+jDq(H)$) and an error signal Eh ($=Ep(H)+jEq(H)$). While, the demodulator 38 receives the distortion free siganl IFv from the subtracter 24, and generates a baseband or data signal Dv ($=Dp(V)+jDq(V)$) and an error signal Ev ($=Ep(V)+jEq(V)$). The control signal generator 34 is supplied with the error signals Ep(H), Eq(H) and the baseband signals signals Dp(V), Dq(V), and multiplies the error signal Eh by the complex conjugate of the baseband signal Dv. Viz:

$$
\begin{aligned}
Eh \cdot Dv^* &= (Ep(H) + jEq(H)) \cdot (Dp(V) - jDq(V)) \\
&= (Ep(H) \cdot Dp(V) + Eq(H) \cdot Dq(V)) + \\
&\quad j(Eq(H) \cdot Dp(V) - Ep(H) \cdot Dq(V)) \\
&\equiv ICh + jQCh
\end{aligned}
\tag{1}
$$

wherein Dv* denotes the complex conjugate of Dv.

The numbers of the control signals ICh and QCh depend on the numbers of variable weighting circuits of the transversal filter 28. Similarly, the number of the control signals ICv and QCv depend on the numbers of variable weighting circuits of the transversal filter 22.

In the above, the cancellation or reduction of the cross-polarization distortion caused by the vertically polarized wave component has been discussed. The same discussion is applicable to the cancellation or reduction of the cross-polarization distortion caused by the horizontally polarized wave component, so that the further description thereof will be omitted for clarity.

The algorithms similar to but applied to the baseband stage of a digital receiver for the purpose of cancelling the cross-polarization distortion is known to those skilled in the art (for example, refer to U.S. Pat. No. 4,321,705).

In a quadrature modulating system (for example, 4 PSK (Phase Shift Keying) or 16 QAM (Quadrature Amplitude Modulation)), there are four lock phases for recovering a carrier wave as denoted by (1) through (4) in FIG. 2. Consequently, in connection with the demodulator 32, for example, the four lock phases produce four different combinations of the error signals Ep(H) and Eq(H) as shown in the table of FIG. 3. Assuming that in the first lock phase (1) the control signal generator 34 assumes a correct correlation between the applied signals (Dp(V), Dq(V), Ep(H) and Eq(H)). In this case, if the lock phase changes from (1) to (2), then the control signal generator 34 no longer implements correct correlation. This is because the error signals Ep(H) and Eq(H) changes to Eq(H) and −Ep(H) respectively. It will therefore be understood that the error signals should properly be changed according to the changes of the lock phases in each demodulator.

A first embodiment of this invention is therefore directed to a canceller for cross-polarization distortion, which implements correctly the interference cancellation irrespective of the phase differences of two recovered carriers derived from the demodulators 32 and 38.

Figure 4:
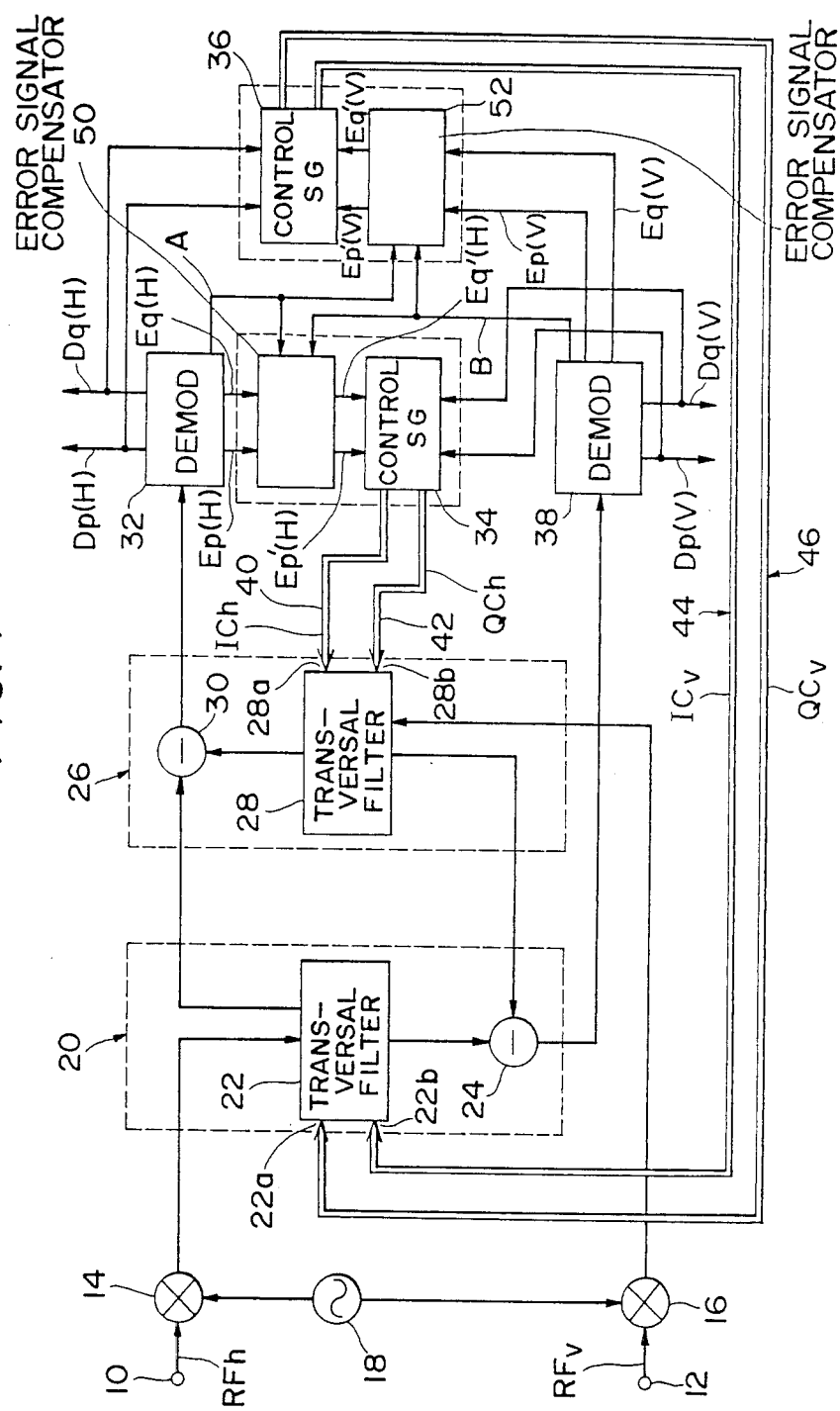
FIG. 4 is a block diagram showing a first embodiment of this invention.

Referring now to FIG. 4, there is shown in block diagram form the first embodiment of this invention.

The block diagram of FIG. 4 is similar to that of FIG. 1 except that the former is further provided with two error signal compensating circuits 50 and 52. The compensator 50 receives the error signals Ep(H) and Eq(H) from the demodulator 32, and is also supplied with recovered carrier waves A and B from the demodulators 32 and 38 respectively. The compensator 50 determines two new (i.e., compensated) error signals Ep'(H) and Eq'(H), depending on the phase difference between the applied carrier waves A and B, and thence applies the new error signals to the control signal generator 34.

Similarly, the other compensator 52 receives the error signals Ep(V) and Eq(V) from the demodulator 38, and is also supplied with the recovered carrier waves A and B. The compensator 52 determines two compensated error signals Ep'(V) and Eq'(V) according to the phase differences between the applied two carrier waves A and B, and thence applies them to the control signal generator 36. It should be noted that the compensator 52 is not necessarily provided with the function of comparing the phase difference between the two carrier waves A and B. In this case, the compensator 52 does not receive the two carrier waves A and B, and instead is supplied with a signal indicating the result of the comparison from the compensator 50.

For the convenience of simplicity, discussion will be made only in connection with the compensating circuit 50.

Referrence is made to FIG. 5, which shows in block diagram form detailed circuitry of the error signal compensator 50. The FIG. 5 arrangement comprises a 90°-directional coupler 60, two correlators 62 and 64 (each of which is a multiplier in this case), two low-pass filters 66 and 68, binary decision circuits 70 and 72, and an error signal converter 74, all of which are coupled as shown.

In operation, the 90°-directional coupler 60 is supplied with the recovered carrier A and generates two outputs having a phase difference of 90° with each other. The two outputs of the coupler 60 are applied to the correlators 62 and 64. Each of the correlators 62 and 64 also receives the recovered carrier B, and correlates the received two carriers. The outputs of the correlators 62 and 64 are respectively applied to the low-pass filters 66 and 68, which are adapted to remove components leaked from one carrier to the other and which respectively output signals "i" and "j" as shown by broken lines in FIG. 6. The amplitudes of the outputs "i" and "j" depend on the phase difference of the two recovered carriers A and B. The outputs "i" and "j" are respectively fed to the binary decision circuits 70 and 72, and are respectively converted therein into corresponding binary signals as shown by solids lines "k" and "l" in FIG. 6. The binary signals "k" and "l" are fed to the error signal converter 74 to which the error signals Ep(H) and Eq(H) are also applied from the demodulator 32 (FIG. 4). The converter 74 converts the incoming error signals Ep(H) and Eq(H) into the new error signals Ep'(H) and Eq'(H) according to the applied binary signals "k" and "l". The conversion table of the error signals are shown in FIG. 7. The detailed circuitry of the error signal converter 74 is shown in FIG. 8.

Figure 8:
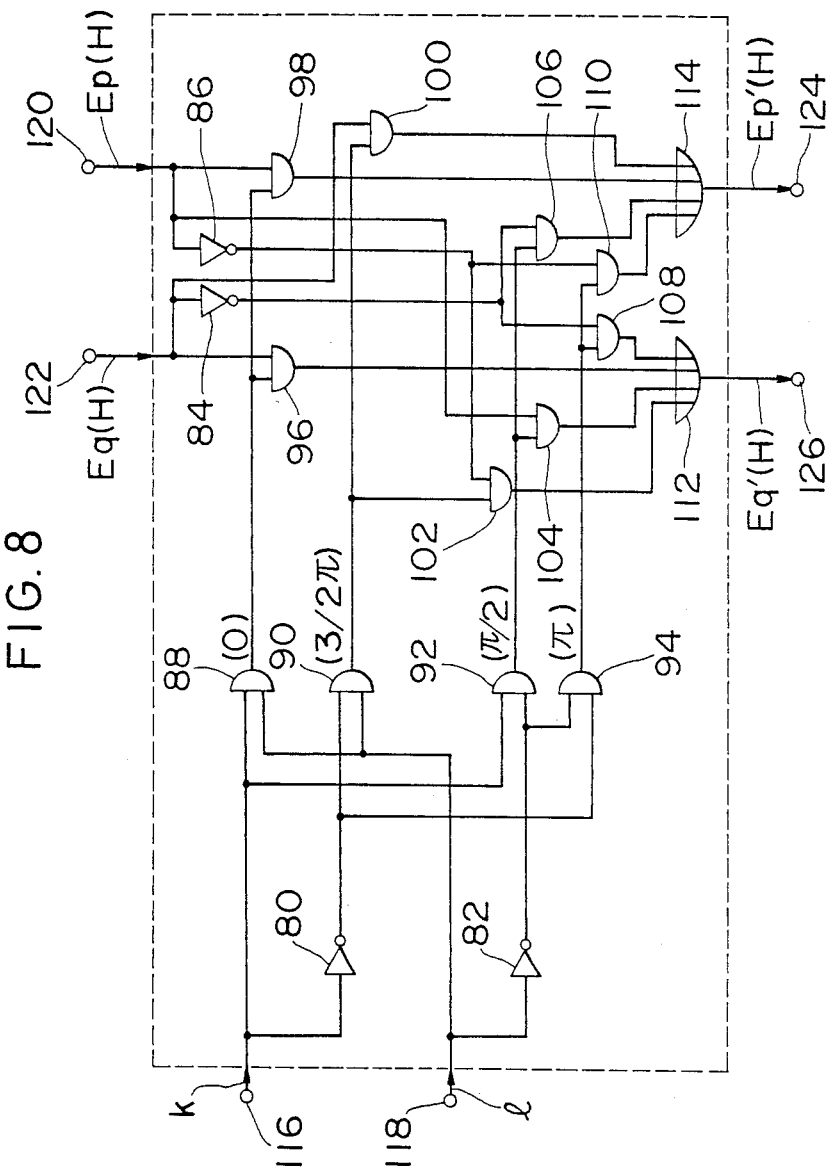
FIG. 8 is a block diagram showing in detail part of the FIG. 5 arrangement.

FIG. 8 shows in detail an example of the abovementioned converter 74. As illustrated this circuit comprises inverters 80, 82, 84, and 86, AND gates 88, 90, 92, 94, 96, 98, 100, 102, 104, 106, 108, and 110, OR gates 112 and 114, all of which are connected as shown. The binary signals "k", "l" and the error signals Ep(H), Eq(H) are respectively applied to the converter 74 via input terminals 116, 118, 120 and 122, while the resultant new error signals Ep'(H) and Eq'(H) are obtainable at outputs 124 and 126, respectively.

In the case where each of the signals "k" and "l" assumes a logic "1", the AND gates 88, 96 and 98 open while the remaining AND gates remains closed. Consequently, the error signals Ep(H) and Eq(H) are derived from the outputs 124 and 126 respectively as the new error signals. While, if the signals "k" and "l" assume respectively logics "1" and "0", then the AND gates 92, 104 and 106 open, so that the new error signals −Eq(H) and Ep(H) are derived from the outputs 124 and 126 respectively. If the signals "k" and "l" each assumes a logic "0", only the AND gates 94, 108 and 110 open with the result that the error signals −Ep(H) and −Eq(H) are obtained from the outputs 124 and 126 respectively as the new error signals. On the other hand, when the signals "k" and "l" respectively assume logics "0" and "1", resulting in the opening of the AND gates 90, 100 and 102 and the closing of the remaining AND gates, so that the new error signals Eq(H) and −Ep(H) appear at the outputs 124 and 126 respectively as the new error signals.

In accordance with the first embodiment of this invention, the cross-polarization distortion can substantially be eliminated irrespective of the phase difference of the two recovered carriers. More specifically, even if propagation delay time due to fading (for example) causes the phase difference between the recovered carriers, the interference is substantially cancelled. Furthermore, the first embodiment of this invention is practically advantageous in the case where the difference between the transmitting frequencies of the horizontal and vertical waves causes beats of the recovered carriers in a receiver.

Figure 9:
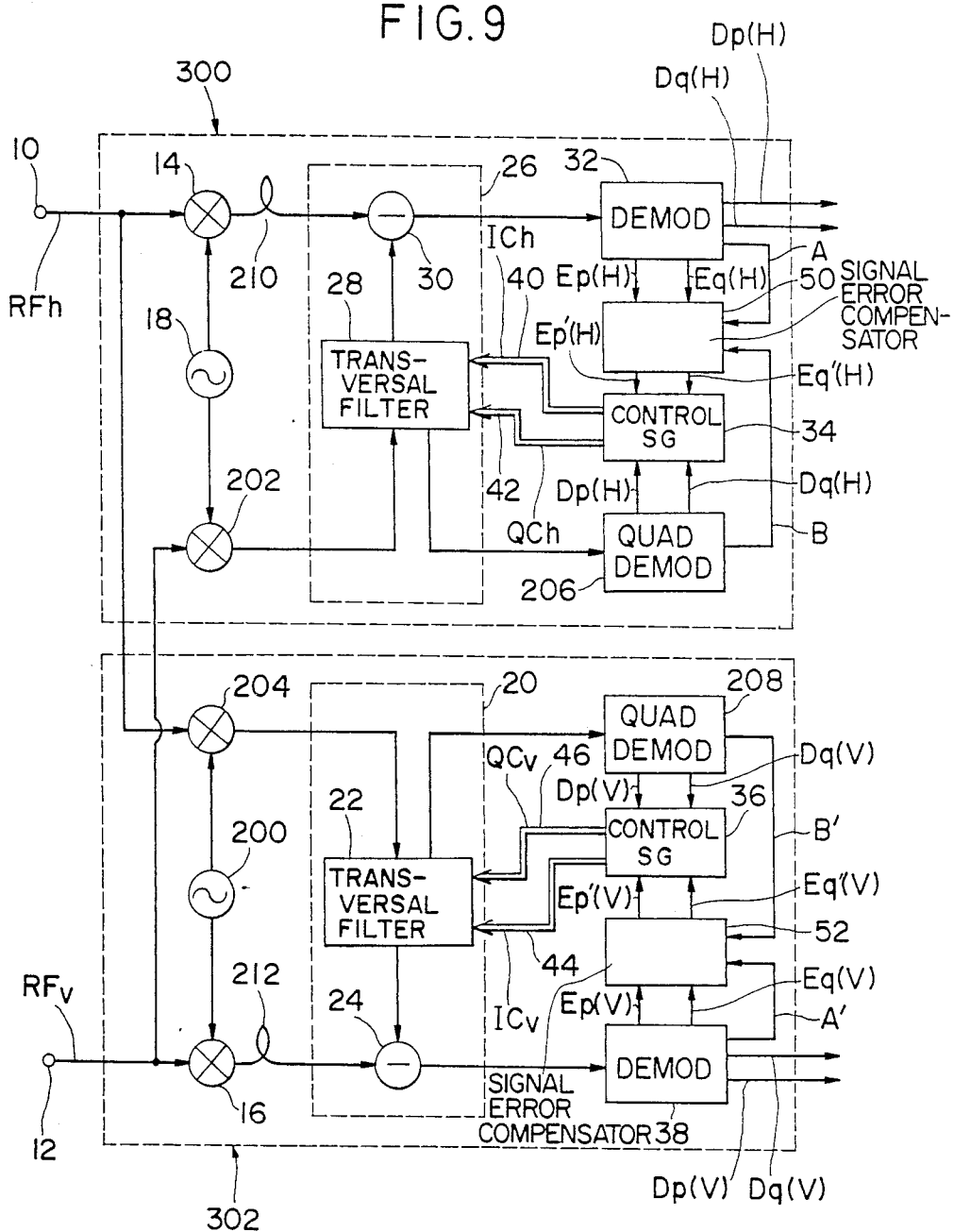
FIG. 9 is a block diagram showing a second embodiment of this invention.

Referring now to FIG. 9, there is shown in block diagram form a second embodiment of this invention. This embodiment is similar to the first embodiment, but is designed to allow the two (horizontal and vertical) interference cancellers to be provided in two remote or separate receiving channels. To this end, the FIG. 9 embodiment further comprises a local oscillator 200, two mixers 202 and 204, two quadrature demodulators 206 and 208, and two delay lines 210 and 212.

The FIG. 9 embodiment is grouped into horizontal and vertical sections 300 and 302, in which the blocks identical with the blocks shown in FIG. 4 are denoted by like numerals, and the operations thereof will not be referred to for brevity.

The horizontal section 300 comprises two mixers 14 and 202, local oscillator 18, delay line 210, variable coupler 26 consisting of transversal filter 28 and subtracter 30, demodulator 32, control signal generator 34, error signal compensating circuit 50, and quadrature demodulator 206, all of which are coupled as shown.

Similarly, the veritical section 302 comprises two mixers 16 and 204, local oscillator 200, delay line 212, variable coupler 20 consisting of transversal filter 22 and subtracter 24, demodulator 38, control signal generator 36, error signal compensating circuit 52, and quadrature demodulator 208, all of which are coupled as shown.

It should be noted that the operations of the two sections 300 and 302 are identical, so that only section 300 will be referred to hereinlater. The incoming modulated digital signals RFh and RFv are applied to the mixers 14 and 202 via the input terminals 10 and 12 respectively. The IF output of the mixer 14 is delayed in the delay line 210 by a predetermined amount of time and is fed to the subtracter 30, while the IF output of the mixer 202 is supplied to the transversal filter 28. The delay line 210 is provided for equalizing the delay times of the signals applied to the subtracter 30. The quadrature demodulator 206 applies the baseband data Dp(H), Dq(H) and also the aforementioned recovered carrier B. The quadrature demodulator 206 is not required to generate the error signals as with the demodulator 32 and hence can be constructed in a simpler manner as compared therewith. The algorithm for cancelling the cross-polarization of the second embodiment is identical to that discussed in connection with the first embodiment, so further description will not given.

Figure 10:
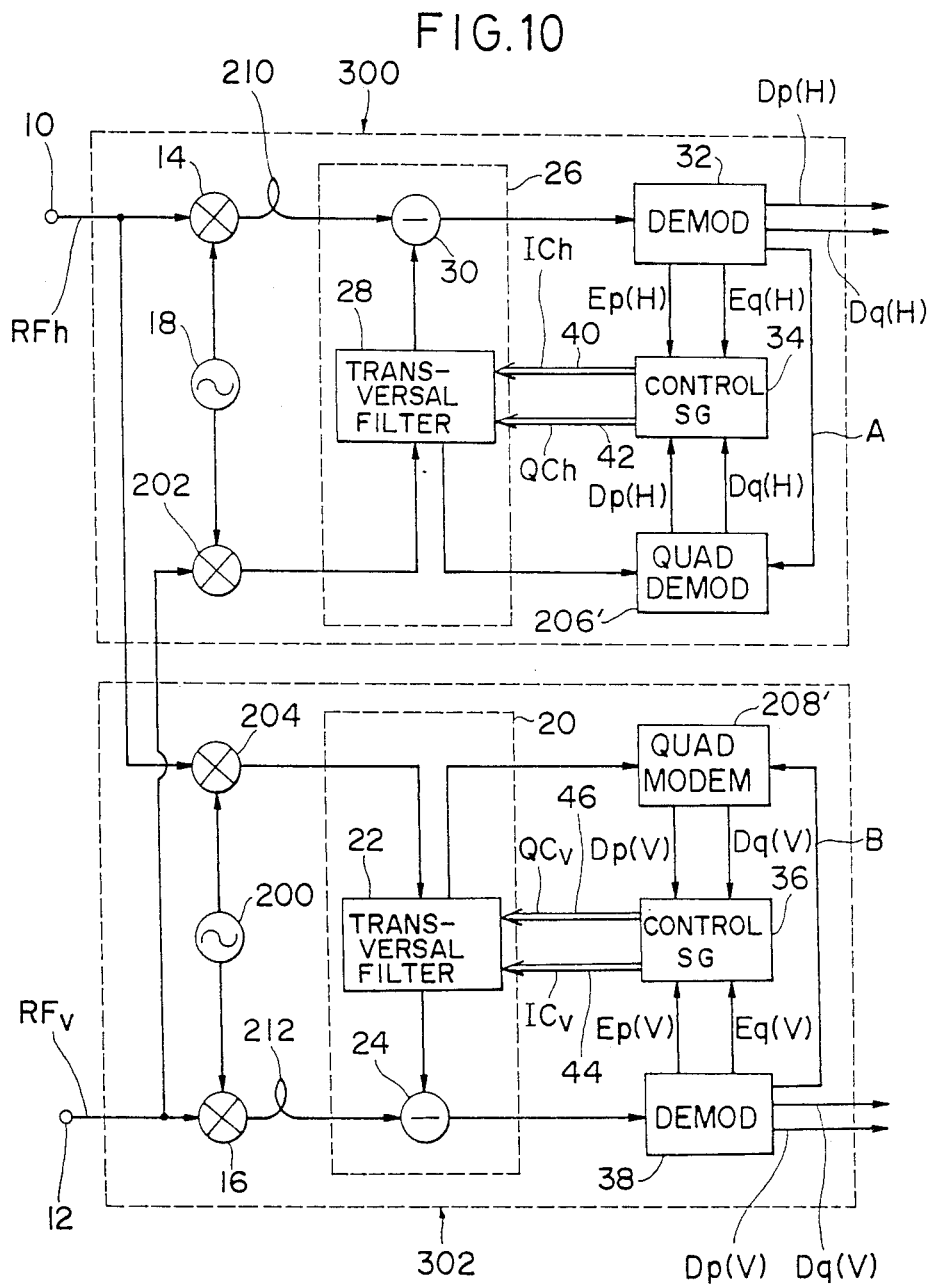
FIG. 10 is a block diagram showing a third embodiment of this invention.

Referring to FIG. 10, there is shown in block diagram form a third embodiment of this invention, which is a modification of the second embodiment and hence is suited for similar application.

Comparing the arrangements of FIGS. 9 and 10 shows that the latter is not provided with the error signal compensating circuits 50 and 52, and includes quadrature demoduators 206' and 208' in place of their counterparts 206 and 208 respectively. Each of the quadrature demodulators 206' and 208' is a type having no carrier wave recovery function. The quadrature demodulators 206' and 208' are respectively supplied with the recovered carriers A and B from the demodulators 32 and 38, and perform coherent demodulations using the received recovered carriers and produce therefrom the baseband signals Dp(H), Dq(H), Dp(V) and Dq(V) as shown. The third embodiment features that (1) the quadrature demodulators 206' and 208' can be arranged in much simpler configurations, and (2) the error signal compensating circuits are not needed in that the error and baseband signals of each of the sections 300 and 302 are produced utilizing the same recovered carrier.

According to the second and third embodiments, each of the dual channel receivers receives only the RF modulated signal from the other receiver. Consequently, many practical advantages are found in these embodiments. For example, the distortion cancellers embodying this invention can readily be installed in an existing pair of channel receivers each having a local oscillator. Further, these embodiments find advantageous application in the case where the two receivers are separated by a considerable distance by offsetting the considerable power drain of the local oscillator signal which would otherwise tend to occur over the long connection line.

Figure 11:
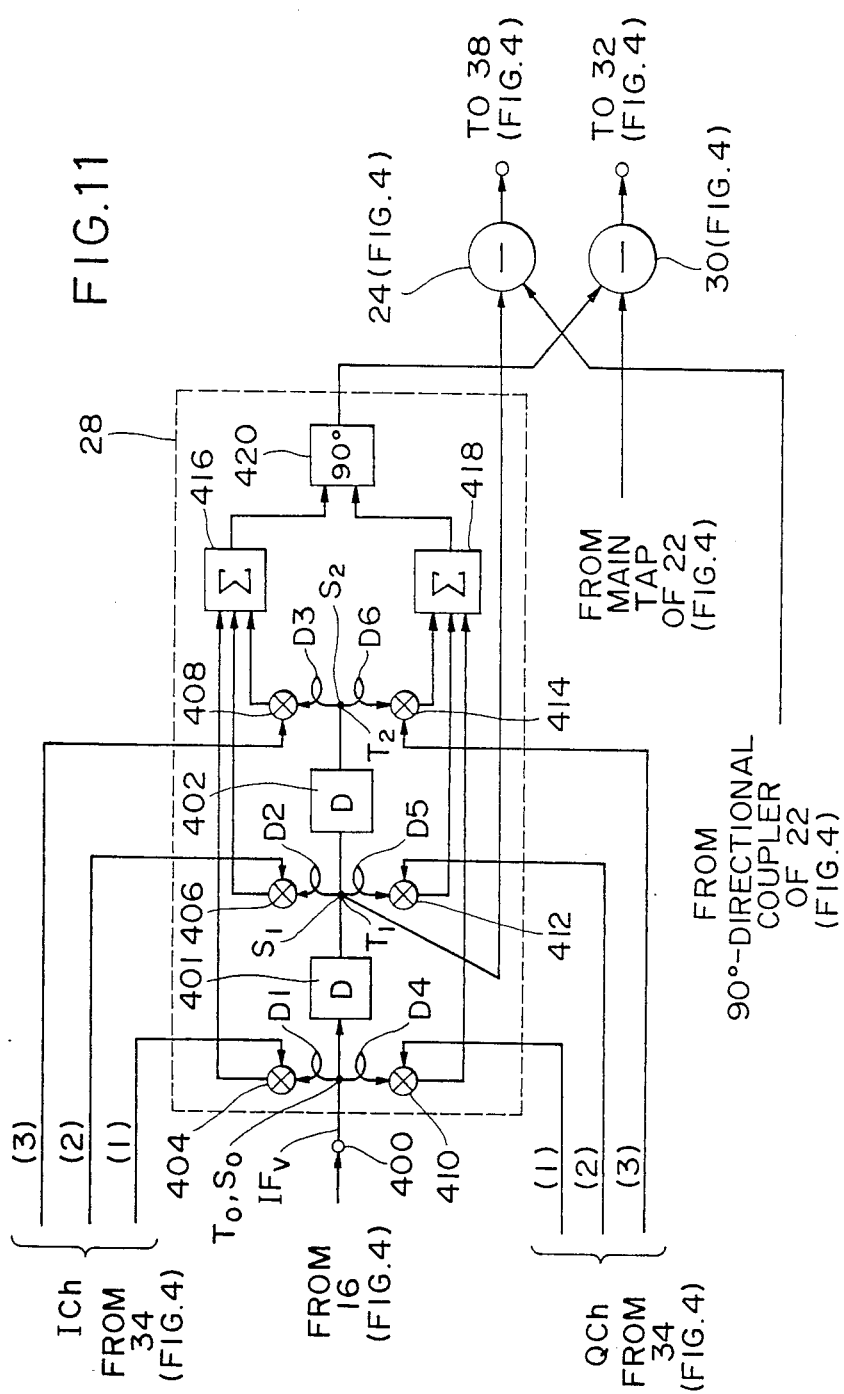
FIG. 11 is a block diagram showing in detail an improvement of a transversal filter used in this invention.

Reference is now made to FIG. 11, which shows in block diagram form a fourth embodiment of this invention, together with associated blocks. This arrangement is directed to an improvement of the transversal filter 22 or 28 (FIG. 4) provided in the IF section, and, more specifically, features the provision of phase compensating delay lines for expanding the stable range of filter operation.

This embodiment will be discussed in connection with 3-tapped delay line filter as for example, but is extendable to a general application wherein the filter takes a form of N-tapped type (N is an arbitrary positive integer).

In FIG. 11, the transversal filter 28 shown in block in FIG. 4 is presented by way of example. The filter 28 comprises an input terminal 400 to which the modulated vertical IF signal IFv is applied from the mixer 16 (FIG. 4), delay circuits 401 and 402, variable weighting circuits 404, 406, 408, 410, 412 and 414, delay lines D1 through D6, adders 416 and 418, and a 90°-directional coupler 420, all of which are coupled as shown.

The signal IFv is applied via the input 400 to the delay circuit 401 and also to the variable weighting circuits 404 and 410 through the compensating delay lines D1 and D4 respectively. The weighting circuits 404 and 410, coupled to the tap T0, are arranged to multiply the signal IFv (or S0) by the in-phase control signals ICh(1) and the quadrature control signal QCh(1) which are derived from the control signal generator 34 (FIG. 4). The signal S1 is supplied, via the delay lines D2 and D5, to the variable weighting circuits 406 and 412 coupled to the main tap T1, and is thence multiplied therein by the in-phase control signal ICh(2) and the quadrature control signal QCh(2). The signal S2 is applied to the variable weighting circuits 408 and 414, and is multiplied therein by the in-phase control signal ICh(3) and the quadrature control signal QCh(3) respectively. The outputs of the weighting circuits 404, 406 and 408 are summed up at a summing circuit 416 which applies its output to the 90°-directional coupler 420, while the outputs of the weighting circuits 410, 412 and 414 are similarly summed up at the summing circuit 418 which applies its output to the coupler 420. The outputs of the summing circuits 416 and 418 are combined in the coupler 420 in a manner to have a phase difference of 90° to each other. The output of the coupler 420 is fed to the subtracter 30 (FIG. 4), while the signal S1 at the main tap T1 is supplied to the subtracter 24 (FIG. 4). It should be noted that the subtracter 24 also receives the output of a 90°-directional coupler forming part of the filter 22 of FIG. 4 (the coupler is not shown in FIG. 4), while the subtracter 30 also receives a signal from a main tap of the filter 22 although not shown in FIG. 4. The outputs of the subtracters 24 and 30 are supplied to the demodulators 38 and 32 (FIG. 4) respectively.

The ideal operation of the transversal filter, provided in the IF stage, is attainable in the case where all the signals S0, S1 and S2 coincide in phase. It is known however that the zero forcing algorithms can practically be applied to the transversal filter, if the phase devidations of signals S0 and S2 from signal S1 falls in the range from −90° to 90°, However, it is difficult to satisfy such condition under practical circumstances in that frequency variations of carrier waves are liable to occur during transmission. The fourth embodiment shown in FIG. 11 is therefore directed to an improvement of the transversal filter for avoiding such problem as set forth in the above.

Figure 12:
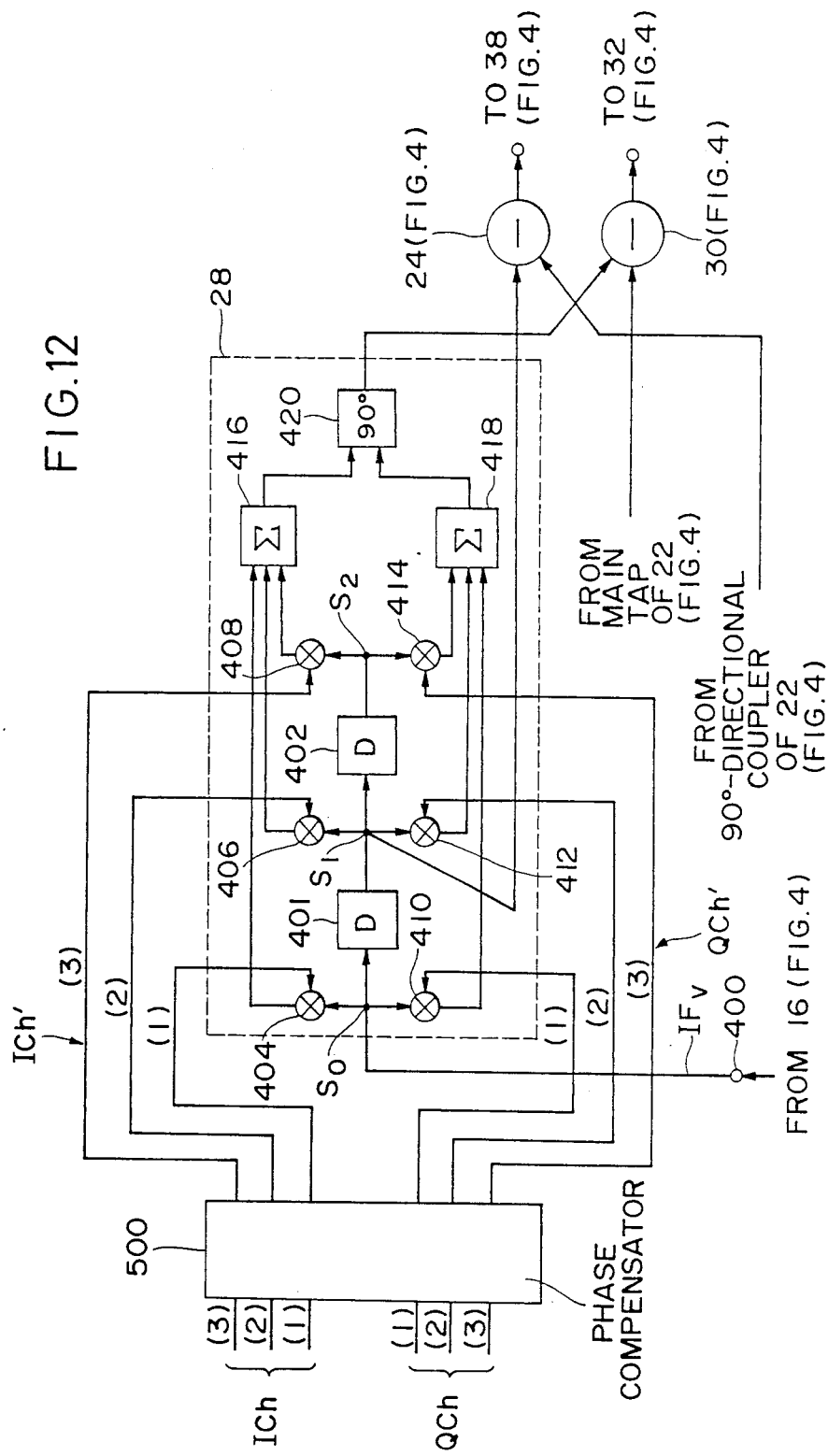
FIG. 12 is a block diagram showing in detail another transversal filter utilized in this invention.

Referring now to FIG. 12, a fifth embodiment of this invention is shown in block diagram form.

According to this arrangement, there is no need to provide the phase-compensating delay lines D1 through D6 shown in FIG. 11. In brief this embodiment features the provision of a control circuit for adjusting the complex phase angles of the tap weight control signals, thereby enabling the application of zero-forcing algorithms to the cancellation of cross-polarization distortion dispensing with any phase-compensating delay line.

Comparing the arrangements of FIGS. 11 and 12 shows that the latter is not provided with the delay lines D1 through D6 and instead includes a phase-compensator 500. For the convenience of clarity, FIG. 12 illustrates only part of the canceller provided in the horizontal receiving channel. However, the whole cancelling scheme of this embodiment is readily understood when taken along with the preceding embodiments. Further, it goes without saying that the same algorithms for cancellation is applicable to the vertical receiving channel.

In FIG. 12, a phase-compensator 500 receives the horizontal tap weight control signal Ch (=ICh+jQCh) from the horizontal control signal generator 34 (FIG. 4). The phase-compensator 500 provides the control signal Ch with a phase shift $\theta$, which can be expressed using the following equation:

$$Ch \cdot e^{j\theta} = (ICh + jQCh) \cdot e^{j\theta} \quad (2)$$
$$= ICh \cdot e^{j\theta} + jQCh \cdot e^{j\theta}$$
$$= (ICh \cdot \cos\theta - QCh \cdot \sin\theta) + j(ICh \cdot \sin\theta + QCh \cdot \cos\theta)$$
$$= ICh' + jQCh'$$
$$= Ch'$$

wherein Ch' denotes a new tap weight control signal consisting of in-phase and quadrature control signals ICh' and QCh'. In the FIG. 12 arrangement, the phase-compensator 500 receives three in-phase control signals ICh(1) through ICh(3) as well as three quadrature control signals QCh(1) through QCh(3) and thence outputs corresponding three in-phase control signals ICh'(1) through Ich'(3) and also corresponding three quadrature control signals QCh'(1) through QCh'(3).

Substituting $\theta$ of Equation (1) by $\pm\pi/2$ radians, 0 radian and radians respectively, then the following equations (3), (4) and (5) are obtained:

$$(\text{for } \theta = \pm \pi/2)$$
$$Ch \cdot e^{j\theta} = \mp QCh \pm jICh \quad (3)$$
$$= ICh' + jQCh'$$
$$= Ch'$$
$$(\text{for } \theta = 0)$$
$$Ch \cdot e^{j\theta} = ICh + jQCh \quad (4)$$
$$= ICh' + jQCh'$$
$$= Ch'$$
and
$$(\text{for } \theta = \pi)$$
$$Ch \cdot e^{j\theta} = \mp ICh - jQCh \quad (5)$$
$$= ICh' + jQCh'$$
$$= Ch'$$

Equation (3), (4) and (5) indicate that each of ICh' and QCh' can assume one of the four values $\pm ICh$ and $\pm QCh$ by shifting in phase the tap weight control signal Ch by $-\pi/2$ radians, 0 radian, $+\rho/2$ radians or radians. In other words, in case where the control signal Ch is shifted in phase by a step of $\pi/2$ ranging from $-\pi/2$ to $\pi$ radians while maintaining the algorithms of a transversal filter, then the cancellation of cross-polarization distortion can correctly be implemented by (1) rearranging the incoming error signals ICh and QCh for cancelling the cross interference and thence (2) outputting them as new tap weighting signals ICh' and QCh'.

It should be noted that the phase shift degree is not limited to $\pi/2$ radians but is selectable to take another adequate degree.

The foregoing description shows only preferred embodiments of the present invention. Various modifications are apparent to those skilled in the art without departing from the scope of the present invention which is only limited by the appended claims.

What is claimed is:

1. A cross-polarization distortion canceller for use in a digital radio communication receiver, comprising:

a first variable coupler (26) being adapted to receive a first IF signal of incoming two orthogonally polarized modulated IF signals;

a second variable coupler (20) being adapted to receive a second IF signal of said incoming two orthogonally polarized modulated IF signals;

a first demodulator (32) for receiving said first IF signal via said first variable coupler and demodulating said first IF signal, said first demodulator producing first baseband signals as well as first error signals according to said first IF signal, and outputting a first recovered carrier;

a second demodulator (38) for receiving said second IF signal via said second variable coupler and demodulating said second IF signal, said second demodulator producing second baseband signals as well as second error signals according to said second IF signal, and outputting a second recovered carrier;

a first error signal compensator (50) for receiving said first error signals and said first and second recovered carriers, said first error signal compensator outputting third error signals according to the phase differences between said first and second recovered carriers;

a second error signal compensator (52) for receiving said second error signals, said second error signal compensator outputting fourth error signals according to the phase differences between said first and second recovered carriers;

a first control signal generator (34) for receiving said third error signals and said second baseband signals, said first control signal generator applying first control signals to said first variable coupler; and a second control signal generator (36) for receiving said fourth error signals and said first baseband signals, said second control signal generator applying second control signals to said second variable coupler;

wherein said first variable coupler substantially cancels the portion of said second IF signal accompanying said first IF signal, and wherein said second variable coupler substantially cancels the portion of said first IF signal accompanying said second IF signal.

2. A cross-polarization distortion canceller as claimed in claim 1, wherein said first variable coupler includes:

a subtractor (30) having two inputs and one output, said output being connected to said first demodulator, and one of said two inputs being adapted to receive said first IF signal; and a transversal filter (28) for receiving said first control signals and said second IF signal, said transversal filter being connected to said subtractor via the other of said two inputs of said subtractor.

3. A cross-polarization distortion canceller as claimed in claim 1, wherein said second variable coupler includes:

a subtractor (24) having two inputs and one output, said output being connected to said second demodulator, and one of said two inputs being adapted to receive said second IF signal; and a transversal filter (22) for receiving said second control signals and said first IF signal, said transversal filter being connected to said subtractor via the other of said two inputs of said subtracter.

4. A cross-polarization distortion canceller as claimed in claim 1, wherein said first error signal compensator includes:

a 90°-directional coupler (60) for receiving one of said first and second recovered carriers;

a first correlator (62) coupled to one of two outputs of said 90°-directional coupler;

a second correlator (64) coupled to the other output of said 90°-directional coupler, said first and second correlators receiving the other of said first and second recovered carriers;

a first binary decision circuit (70) for receiving the output of said first correlator and generating corresponding binary values;

a second binary decision circuit (72) for receiving the output of said second correlator and generating corresponding binary values;

an error signal converter (74) for receiving the outputs of said first and second binary decision circuits and also receiving said first error signals, said error signal converter converting said first error signals into said third error signals according to the outputs of said first and second binary decision circuits.

5. A cross-polarization distortion canceller as claimed in claim 1, wherein said second error signal compensator includes:

a 90°-directional coupler for receiving one of said first and second recovered carriers;

a first correlator coupled to one of two outputs of said 90°-directional coupler;

a second correlator coupled to the other output of said 90°-directional coupler, said first and second correlators receiving the other of said first and second recovered carriers;

a first binary decision circuit for receiving the output of said first correlator and generating corresponding binary values;

a second binary decision circuit for receiving the output of said second correlator and generating corresponding binary values;

an error signal converter for receiving the outputs of said first and second binary decision circuits and also receiving said second error signals, said error signal converter converting said second error signals into said fourth error signals according to the outputs of said first and second binary decision circuits.

6. A cross-polarization distortion canceller as claimed in claim 2, wherein said transversal filter includes:

a tapped delay line provided with (N−1) delay means and N taps (N being a positive integer);

two groups of N variable weighting circuits coupled to said N taps respectively; and two groups of N phase-adjusting delay lines each arranged between each pair consisting of the delay means and the tap.

7. A cross-polarization distortion canceller as claimed in claim 3, wherein said transversal filter includes:

a tapped delay line provided with (N−1) delay means and N taps (N being a positive integer);

two groups of N variable weighting circuits coupled to said N taps respectively; and two groups of N phase-adjusting delay lines each arranged between each pair consisting of the delay means and the tap.

8. A cross-polarization distortion canceller as claimed in claim 2, wherein said transversal filter includes:

a tapped delay line provided with (N−1) delay means and N taps (N being a positive integer);

two groups of N variable weighting circuits coupled to said N taps respectively; and, wherein said cross-polarization distortion canceller further comprises a phase-compensator (500) provided between said first control signal generator and said transversal filter, said phase-compensator adaptively controlling the complex phase angle of at least one of said first control signals according to the phase differences of the signals appearing at said taps.

9. A cross-polarization distortion canceller as claimed in claim 8, wherein said complex phase angle control is discretely implemented by shifting the phase angle of the first control signal by $\pi/2$ radians.

10. A cross-polarization distortion canceller as claimed in claim 3, wherein said transversal filter includes:

a tapped delay line provided with (N−1) delay means and N taps (N being a positive integer);

two groups of N variable weighting circuits coupled to said N taps respectively; and, wherein said cross-polarization distortion canceller further comprises a phase-compensator (500) provided between said second control signal generator and said transversal filter, said phase-compensator adaptively controlling the complex phase angle of at least one of said second control signals according to the phase differences of the signals appearing at said taps.

11. A cross-polarization distortion canceller as claimed in claim 10, wherein said complex phase angle control is discretely implemented by shifting the phase angle of the second control signal by $\pi/2$ radians.

12. A cross-polarization distortion canceller for use in a digital radio communication receiver, said digital radio communication receiver being provided with first and second receiving channels adapted to receive respectively first and second RF modulated signals which are orthogonally polarized, said first receiving channel comprising:

(a) first and second mixers (14, 202) for receiving said first and second RF modulated signals respectively and for producing first and second IF signals respectively;

(b) a first variable coupler (26) for receiving said first and second IF signals;

(c) a first demodulator (32) for receiving said first IF signal via said first variable coupler and demodulating said first IF signal, said first demodulator producing first baseband signals as well as first error signals according to said first IF signal, and outputting a first recovered carrier;

(d) a first quadrature demodulator (206) for receiving said second IF signal via said first variable coupler, said first quadrature demodulator demodulating said second IF signal, and producing second baseband signals and a second recovered carrier according to said second IF signal;

(e) a first error signal compensator (50) for receiving said first error signals and said first and second recovered carriers, said first error signal compensator outputting second error signals according to the phase differences between said first and second recovered carriers; and (f) a first control signal generator (34) for receiving said second error signals and said second baseband signals, said first control signal generator applying first control signals to said first variable coupler; and said second receiving channel comprising:

(a) third and fourth mixers (16, 204) for receiving said second and first RF modulated signals respectively and for producing third and fourth IF signals respectively;

(b) a second variable coupler (20) for receiving said third and fourth IF signals;

(c) a second demodulator (38) for receiving said third IF signal via said second variable coupler and demodulating said first IF signal, said second demodulator producing third baseband signals as well as third error signals according to said third IF signal, and outputting a third recovered carrier;

(d) a second quadrature demodulator (208) for receiving said fourth IF signal via said second variable coupler, said second quadrature demodulator demodulating said fourth IF signal, and producing fourth baseband signals and a fourth recovered carrier according to said fourth IF signal;

(e) a second error signal compensator (52) for receiving said third error signals and said third and fourth recovered carriers, said second error signal compensator outputting fourth error signals according to the phase differences between said third and fourth recovered carriers; and (f) a second control signal generator (36) for receiving said fourth error signals and said fourth baseband signals, said second control signal generator applying second control signals to said second variable coupler;

wherein said first variable coupler substantially cancels the portion of said second IF signal accompanying said first IF signal, and wherein said second variable coupler substantially cancels the portion of said fourth IF signal accompanying said third IF signal.

13. A cross-polarization distortion canceller as claimed in claim 12, wherein said first error signal compensator includes:

a 90°-directional coupler (60) for receiving one of said first and second recovered carriers;

a first correlator (62) coupled to one of two outputs of said 90°-directional coupler;

a second correlator (64) coupled to the other output of said 90°-directional coupler, said first and second correlators receiving the other of said first and second recovered carriers;

a first binary decision circuit (70) for receiving the output of said first correlator and generating corresponding binary values;

a second binary decision circuit (72) for receiving the output of said second correlator and generating corresponding binary values;

an error signal converter (74) for receiving the outputs of said first and second binary decision circuits and also receiving said first error signals, said error signal converter converting said first error signals into said second error signals according to the outputs of said first and second binary decision circuits.

14. A cross-polarization distortion canceller as claimed in claim 12, wherein said second error signal compensator includes:

a 90°-directional coupler (60) for receiving one of said third and fourth recovered carriers;

a first correlator (62) coupled to one of two outputs of said 90°-directional coupler;

a second correlator (64) coupled to the other output of said 90°-directional coupler, said first and second correlators receiving the other of said third and fourth recovered carriers;

a first binary decision circuit (70) for receiving the output of said first correlator and generating corresponding binary values;

a second binary decision circuit (72) for receiving the output of said second correlator and generating corresponding binary values;

an error signal converter (74) for receiving the outputs of said first and second binary decision circuits and also receiving said third error signals, said error signal converter converting said third error signals into said fourth error signals according to the outputs of said first and second binary decision circuits.

15. A cross-polarization distortion canceller for use in a digital radio communication receiver, said digital radio communication receiver being provided with first and second receiving channels adapted to receive respectively first and second RF modulated signals which are orthogonally polarized, said first receiving channel comprising:

(a) first and second mixers (14, 202) for receiving said first and second RF modulated signals respectively and for producing first and second IF signals respectively;

(b) a first variable coupler (26) for receiving said first and second IF signals;

(c) a first demodulator (32) for receiving said first IF signal via said first variable coupler and demodulating said first IF signal, said first demodulator producing first baseband signals as well as error signals according to said first IF signal, and outputting a first recovered carrier;

(d) a first quadrature demodulator (206') for receiving said second IF signal via said first variable coupler and demodulating said second IF signal, said first quadrature demodulator receiving said first recovered carrier and producing second baseband signals; and (e) a first control signal generator (34) for receiving said error signals and said second baseband signals, said first control signal generator applying first control signals to said first variable coupler; and said second receiving channel comprising:

(a) third and fourth mixers (16, 204) for receiving said second and first RF modulated signals respectively and for producing third and fourth IF signals respectively;

(b) a second variable coupler (20) for receiving said third and fourth IF signals;

(c) a second demodulator (38) for receiving said third IF signal via said second variable coupler and demodulating said third IF signal, said second demodulator producing third baseband signals as well as second error signals according to said third IF signal, and outputting a second recovered carrier;

(d) a second quadrature demodulator (208') for receiving said fourth IF signal via said second variable coupler and demodulating said fourth IF signal, said second quadrature demodulator receiving said second recovered carrier producing fourth baseband signals;

(e) a second control signal generator (36) for receiving said second error signals and said fourth baseband signals, said second control signal generator applying second control signals to said second variable coupler;

wherein said first variable coupler substantially cancels the portion of said second IF signal accompanying said first IF signal, and wherein said second variable coupler substantially cancels the portion of said fourth IF signal accompanying said third IF signal.

* * * * *